United States Patent [19]
Osawa

[11] Patent Number: 6,069,741
[45] Date of Patent: May 30, 2000

[54] OPTICAL DEVICE HAVING APERTURE ARRAYS FOR SHIELDING LIGHT

[75] Inventor: Yasuhiro Osawa, Miyagi, Japan

[73] Assignee: Ricoh Company, Ltd., Tokyo, Japan

[21] Appl. No.: 09/050,116

[22] Filed: Mar. 30, 1998

[30] Foreign Application Priority Data

Mar. 31, 1997 [JP] Japan ................................ 9-080905
Jun. 12, 1997 [JP] Japan ................................ 9-154970

[51] Int. Cl.$^7$ ................................................ G02B 27/10
[52] U.S. Cl. ........................ 359/621; 359/619; 359/622; 250/363.04; 313/403
[58] Field of Search ............................... 359/618, 619, 359/621, 622; 250/363.04, 363.01; 313/403, 408

[56] References Cited

U.S. PATENT DOCUMENTS

| 5,420,720 | 5/1995 | Gal et al. ............................... | 359/622 |
| 5,499,138 | 3/1996 | Iba ......................................... | 359/619 |
| 5,648,874 | 7/1997 | Sawaki et al. ......................... | 359/622 |
| 5,751,492 | 5/1998 | Meyers .................................. | 359/619 |
| 5,768,023 | 6/1998 | Sawaki et al. ......................... | 359/622 |
| 5,812,322 | 9/1998 | Meyers .................................. | 359/621 |
| 5,822,125 | 10/1998 | Meyers .................................. | 359/621 |

*Primary Examiner*—Loha Ben
*Attorney, Agent, or Firm*—Oblon, Spivak, McClelland, Maier & Neustadt, P.C.

[57] ABSTRACT

An optical device of the present invention includes an input aperture array formed with a plurality of input apertures at a preselected period of arrangement. An output aperture array is formed with a plurality of output apertures respectively facing the input apertures at a preselected period of arrangement. An aperture array intervenes between the input aperture array and the output aperture array and is formed with apertures respectively facing the input apertures and output apertures at a preselected period of arrangement. The aperture array satisfies the following two conditions:

$$t2 > T \cdot (r+R)/(P+r-\rho)$$

$$t1 < t2 \cdot (P-\rho-r)/(P+\rho-r)$$

where T denotes a distance between the input aperture array and the output aperture array, r denotes the half-width of the input apertures, $\rho$ denotes the half-width of the output apertures, R denotes the half-width of the apertures, t1 denotes a distance between the input aperture array and the input surface of the aperture array, and t2 denotes a distance between the input aperture array and the output surface of the aperture array.

3 Claims, 5 Drawing Sheets

OPTICAL DEVICE HAVING APERTURE ARRAYS FOR SHIELDING LIGHT

BACKGROUND OF THE INVENTION

The present invention relates to an optical device for use in, e.g., an optical printer, copier or scanner and a method of fabricating an aperture array for shielding light.

An array type optical device including an input aperture array and an output aperture array is conventional. The input aperture array has a plurality of input apertures formed at a preselected period of arrangement. The output aperture array has a plurality of output apertures formed at a preselected period of arrangement and respectively facing the input apertures. Light incident to the optical device via a desired one of the input apertures is output via the output aperture aligned with the desired input aperture. This type of optical device is included in, e.g., an optical printer, facsimile apparatus, copier or scanner in order to write a latent image electrostatically or to focus an image read. The prerequisite with such an optical device is that light expected to be output via a particular output aperture is prevented from reaching the other output apertures as stray light.

Japanese Patent Publication No. 63-11647, for example, teaches a lens array in which an image input to a single thick lens from an object plane is inverted in the lens and then output via an output plane to be focused in a 1:1 magnification. In this lens array, an absorption layer is provided on the side of each lens other than a curved surface in order to prevent light from leaking to the adjoining lenses. So long as the lens itself is large size, the side of the lens can be easily shielded from light. However, for a compact configuration, it is necessary to reduce the focal distance of the lens and therefore to reduce the diameter of the lens to less than 1 mm. For this reason, mirror tubes serving to shield light at the same time are arranged to constitute a lens array, as described in the above document. In this case, arranging small tubes side by side is not practical because not only the number of parts but also the size of the assembly increase. The tubes are therefore replaced with tubular shield films. However, a lens array with such tubular shield films is difficult to fabricate because the ratio of the length of the tubes to the diameter of the same (aspect ratio) increases with a decrease in the size of the lens array.

Japanese Patent Laid-Open Publication No. 8-1998 discloses an optical device implemented as a print head having an LED (Light Emitting Diode) array chip and a protection layer (shield layer) covering the light emitting surfaces of LEDs. The protection layer is formed with through holes for passing light emitted from the individual light emitting surfaces. Assuming that the LEDs are arranged at a pitch of 600 dpi (dots per inch), then the through holes are arranged at a period of 42.5 $\mu$m. Presumably, each through hole is about several hundred microns deep, considering the thickness of the protection layer. This increases the ratio of the length of the through holes to the diameter of the same (aspect ratio), making it difficult to fabricate the print head.

Japanese Patent Laid-Open Publication No. 8-79447 proposes an optical device including a first lens array facing a document, a second lens array facing the first lens array, and one or more shield films intervening between the first and second lens arrays. The shield films are formed with apertures for passing light emitted from the first lens array. This kind of structure makes it needless to arrange mirror tubes between the lense portions or input apertures of the first lens array and the lense portions or output apertures of the second lens array.

However, the above Laid-Open Publication No. 8-79447 does not clearly show the numbers or the positions of the shield films or the positions of the apertures. Specifically, this document teaches that a single shield film is positioned substantially at the intermediate between the first and second lens arrays (see claim 3). Also, the document teaches that the apertures formed in the film each have a width capable of substantially shielding optical paths extending from the individual lens of the first lens array to the lenses of the second lens array adjoining an expected lens (see claims 4 and 9). Further, the document teaches that a first and a second shield film are provided, and that the distance between the first film and the second lens array, the distance between the second film and the first lens array and the distance between the first and second films are substantially the same (see claim 8). However, the document does not clearly teach the indices of such configurations.

SUMMARY OF THE INVENTION

It is therefore an object of the present invention to provide an optical device capable of reducing an aspect ratio for shielding light, and a method capable of fabricating an aperture array for shielding light with ease.

In accordance with the present invention, an optical device of the present invention includes an input aperture array formed with a plurality of input apertures at a preselected period of arrangement. An output aperture array is formed with a plurality of output apertures respectively facing the input apertures at a preselected period of arrangement. An aperture array intervenes between the input aperture array and the output aperture array and is formed with apertures respectively facing the input apertures and output apertures at a preselected period of arrangement. The aperture array satisfies the following two conditions:

$$t2 > T \cdot (r+R)/(P+r-\rho)$$

$$t1 < t2 \cdot (P-\rho-r)/(P+\rho-r)$$

where T denotes a distance between the input aperture array and the output aperture array, r denotes the half-width of the input apertures, $\rho$ denotes the half-width of the output apertures, R denotes the half-width of the apertures, t1 denotes a distance between the input aperture array and the input surface of the aperture array, and t2 denotes a distance between the input aperture array and the output surface of the output aperture array.

Also, in accordance with the present invention, an optical system includes an input aperture array formed with a plurality of input apertures at a preselected period of arrangement. An output aperture array is formed with a plurality of output apertures respectively facing the input apertures at a preselected period of arrangement. A thin film aperture array layer intervenes between the input aperture array and the output aperture array and is formed with apertures respectively facing the input apertures and output apertures at a preselected period of arrangement. The thin film aperture array layer is located at at least one position spaced from the input aperture array by a distance which is an integral multiple of $T/2^k$ (k being a positive integer).

Further, in accordance with the present invention, in a method of fabricating an aperture array, a plurality of thin, light shielding substrates each being formed with a plurality of apertures at a preselected period of arrangement are stacked with the apertures aligning with each other.

Moreover, in accordance with the present invention, in a method of fabricating an aperture array, at least one of two light shielding substrates having bonding edges to be bonded to each other is formed with a number of notches in its bonding edge perpendicularly to its general plane, and then the bonding edges of the two light shielding substrates are bonded to each other.

In addition, in accordance with the present invention, in a method of fabricating an aperture array, thin film aperture layers are respectively formed on a plurality of transparent substrates except for portions where a plurality of apertures are to be formed at a preselected period of arrangement.

BRIEF DESCRIPTION OF THE DRAWINGS

The above and other objects, features and advantages of the present invention will become apparent from the following detailed description taken with the accompanying drawings in which.

DESCRIPTION OF THE PREFERRED EMBODIMENTS

Preferred embodiments of the present invention will be described hereinafter.

1st Embodiment

Figure 1:
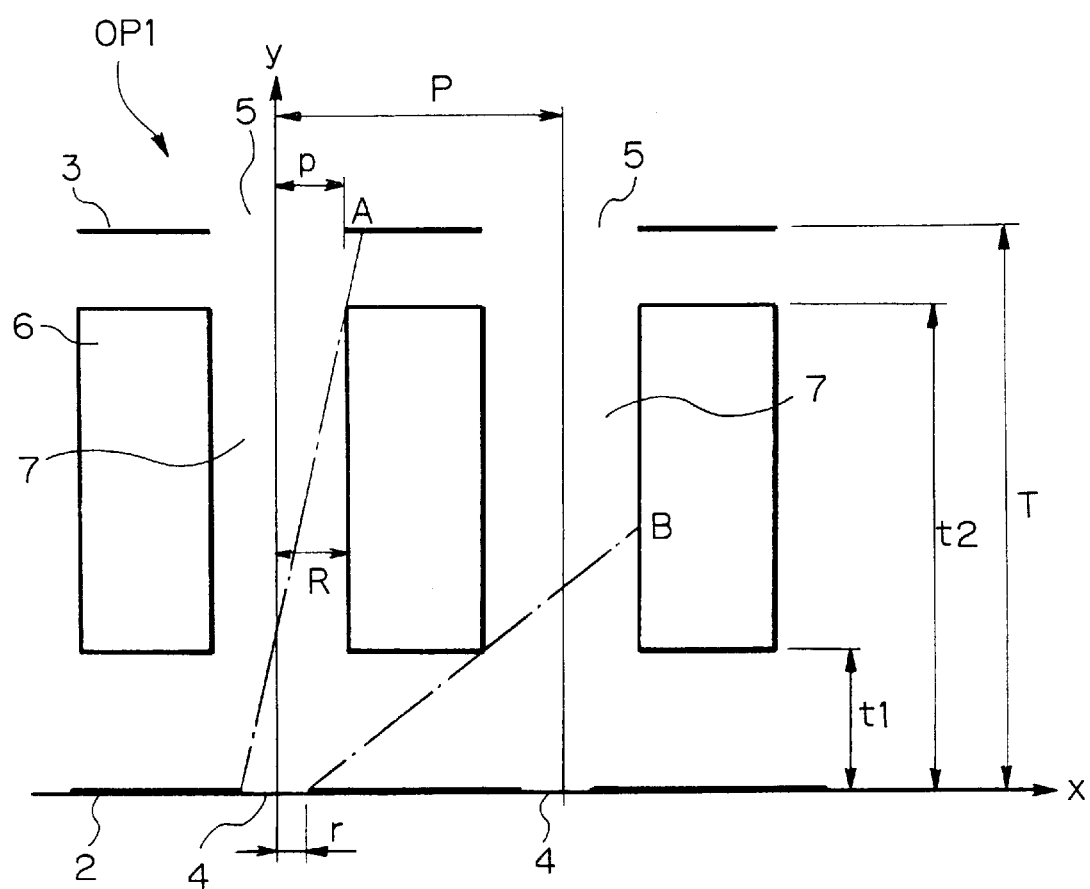
FIG. 1 is a fragmentary section showing a first embodiment of an optical system in accordance with the present invention.

Referring to FIG. 1 of the drawings, an optical device OP1 embodying the present invention is shown. As shown, an input aperture array 2 and an output aperture array 3 are positioned face to face at a preselected distance. The input aperture array 2 has a plurality of input apertures 4 arranged at a preselected period. The output aperture array 3 has a plurality of output apertures 5 respectively facing the input apertures 4. An aperture array 6 is implemented by a thick film and formed with a plurality of apertures 7 respectively facing the input apertures 4 and output apertures 5, as illustrated. The aperture array 6 is provided with a preselected low reflectance at least at the inner edges of the apertures 7 thereof.

Assume that the input aperture array 2 and output aperture array 3 are spaced by a distance T, that the input apertures 4 are arranged at a period P and have a half-width r each, that the output apertures 5 have a half-width $\rho$ each, that the apertures 7 have a half-width R each, that the distance between the input aperture array 2 and the input surface of the aperture array 6 is t1, and that the distance between the input aperture array 2 and the output surface of the aperture array 6 is t2. Then, the aperture array 6 is so configured as to satisfy the following two conditions:

$$t2 > t \cdot (r+R)/(P+r-\rho) \qquad (1)$$

$$t1 < t2 \cdot (P-\rho-r)/(P+\rho-r) \qquad (2)$$

In FIG. 1, assume that an optical axis connecting the center of each input aperture 4 and that of the corresponding output aperture 5 extends in a direction y, and that the input apertures 4 are arranged linearly in a direction x. Then, light incident to a point A is the light most deviated in the direction x with respect to the output aperture 5. Assuming that the point A is represented by coordinates (x, T), then x is produced by:

$$x = T \cdot (r+R)/t2 - r \qquad (3)$$

To prevent light expected to reach a desired output aperture 5 from being incident to the next output aperture 5 over the coordinates of the point A, it is necessary that the maximum value of x does not exceed P–$\rho$. To meet this requirement, there should be satisfied a relation:

$$T \cdot (r+R)/t2 - r < P - \rho \qquad (4)$$

This is why the above relation (1) holds. By so selecting the distance t2, it is possible to prevent the light from being incident to the output aperture 5 next to the expected one.

On the other hand, light incident to a point B is the light to be directed to the adjoining output aperture 5 in the direction y. Assuming that the point B is represented by coordinates (P+r–$\rho$, y), then there holds an equation:

$$y = t1 \cdot (P+\rho-r)/(P-\rho-r) \qquad (5)$$

To prevent light expected to reach a desired output aperture 5 from being incident to the next output aperture 5 over the coordinates of the point B, it is necessary that y be less than 2 inclusive. This is why the relation (2) holds.

Therefore, if the relations (1) and (2) are satisfied, only a part of the gap between the input aperture array 2 and the output aperture array can be shielded by the aperture array 6 such that the light directed toward the output aperture 5 next to the desired one is shielded. Further, the thickness of the aperture array 6 can be made smaller than the distance T between the input aperture array 2 and the output aperture array 3. This allows the aspect ratio of the aperture array 6 for shielding light to be reduced and thereby facilitates the fabrication of the thick film aperture array 6. It is to be noted that the above aspect ratio refers to a ratio of the length of each aperture 7 in the direction of the optical axis to the width of the aperture 7.

2nd Embodiment

A second embodiment of the present invention will be described with reference to FIGS. 2 and 3. In this embodiment and other embodiments to follow, structural elements identical with the elements of the first embodiment are denoted by identical reference numerals.

Figure 2:
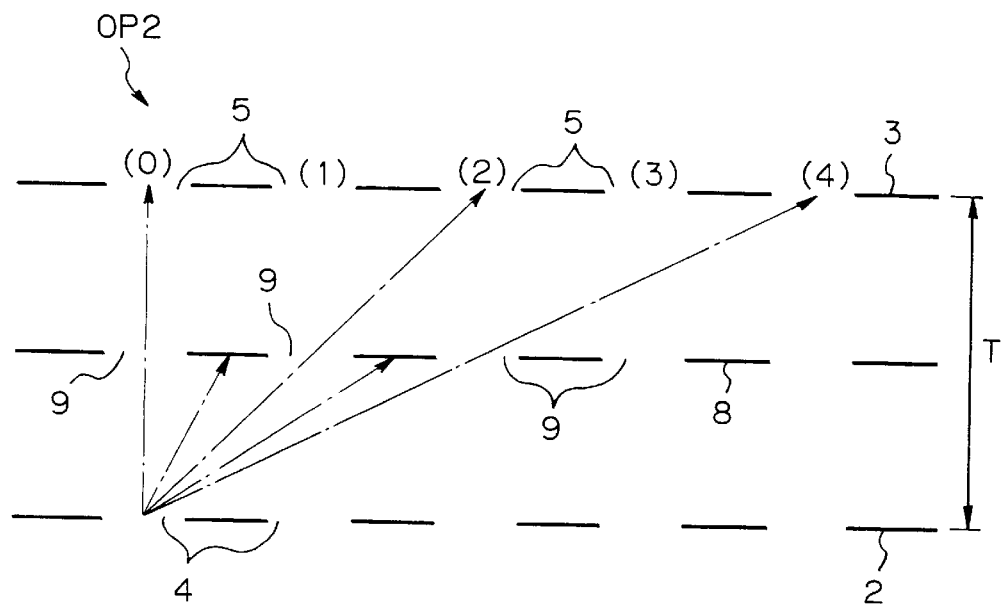
FIG. 2 is a fragmentary section showing a specific form of a second embodiment of the present invention.
Figure 3:
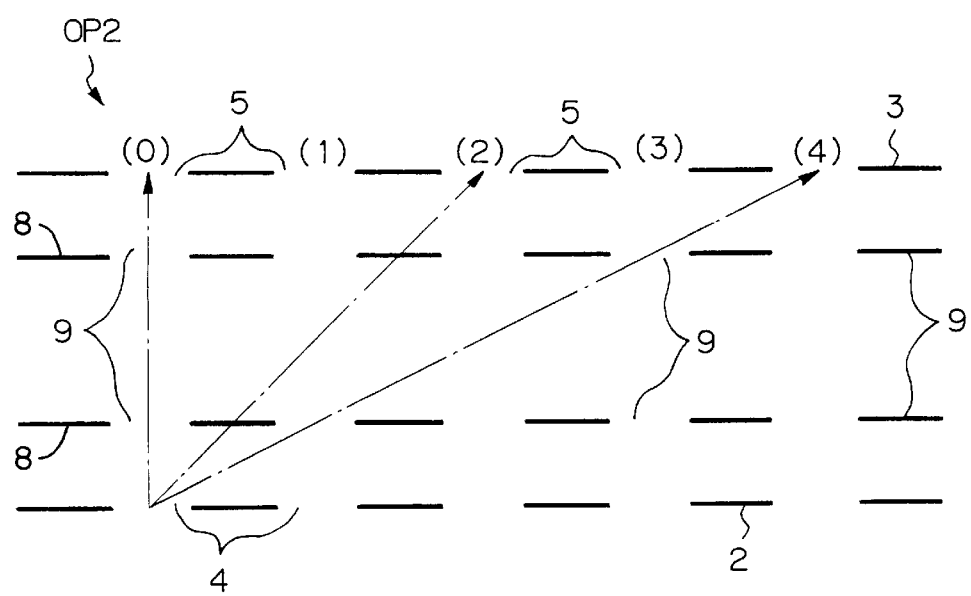
FIG. 3 is a fragmentary section showing another specific form of the second embodiment.

FIGS. 2 and 3 each shows a particular configuration of an optical device OP2. In FIGS. 2 and 3, the input aperture array 2 and output aperture array 3 are positioned face to face at a preselected distance. The input aperture array 2 has a plurality of input apertures 4 arranged at a preselected period. The output aperture array 3 has a plurality of output apertures 5 respectively facing the input apertures 4. A thin film aperture array layer 8 is positioned between the input aperture array 2 and the output aperture array 3. The aperture array layer 8 is formed with a plurality of apertures 9 respectively facing the input apertures 4 and output apertures 5, as illustrated.

Assume that the distance between the input aperture array 2 and the output aperture array 3 is T. Then, the thin film aperture array layer 8 is arranged at at least one position spaced from the input aperture array 2 by a distance which is an integral multiple of $T/2^k$ (k being a positive integer). In the configuration shown in FIG. 2, the thin film aperture array layer 8 is located at a single position spaced from the input aperture array 2 by a distance of T/2. In the configuration shown in FIG. 3, two thin film aperture array layers 8 are respectively arranged at two positions spaced from the input aperture array 2 by distances of T/4 and 3T/4. In FIGS. 2 and 3, dash-and-dots lines are representative of light input via one input aperture 4 selected. The desired output aperture 5 aligned with the input aperture 4 selected is labeled (0) while the output apertures 5 adjacent to the desired output aperture 5 are sequentially labeled (1), (2), (3) and (4).

In FIG. 2, because a single thin film aperture array layer 8 intervenes between the input aperture array 2 and the output aperture array 3, light input via the desired input aperture 4 is output not only via the output aperture (0) but also via the output apertures (2) and (4) corresponding to a period twice as great as the period of arrangement of the output apertures 5. However, it will be seen that light incident to the odd output apertures including the aperture (1) next to the aperture (0) is shielded by the aperture array layer 8.

In FIG. 3, it will be seen that light directed toward the output aperture (2) is shielded by either one of the thin film aperture array layers 8 spaced from the input aperture array 2 by T/4 ($T/2^k$ where k is 2) and 3T/4 ($3T/2^k$), respectively. More specifically, the light is incident to the output apertures 5 corresponding to a period four times as great as the period of arrangement of the output apertures 5 ($2^k$ where k is 2), as counted from the aperture (0), but not incident to the other apertures 5. Therefore, by suitably selecting k, it is possible to set up any desired shielding region from the output aperture (0) to a desired range. Although the light outside of the shielding region is output via the output apertures 5 far from the desired aperture 5, the power of such light is negligibly small because the apertures far from the desired aperture (0) each has an extremely small width due to the inclination of the light and because the light directed toward the remote apertures 5 are repeatedly reflected by the aperture array layers 8. The value k should only be selected in accordance with the specifications of an apparatus using the optical device OP2.

The thin film aperture array layers 8 are easy to produce because they each has an extremely small aspect ratio (ratio of the thickness of each layer 8 to the width of each aperture 9).

3rd Embodiment

Figure 4:
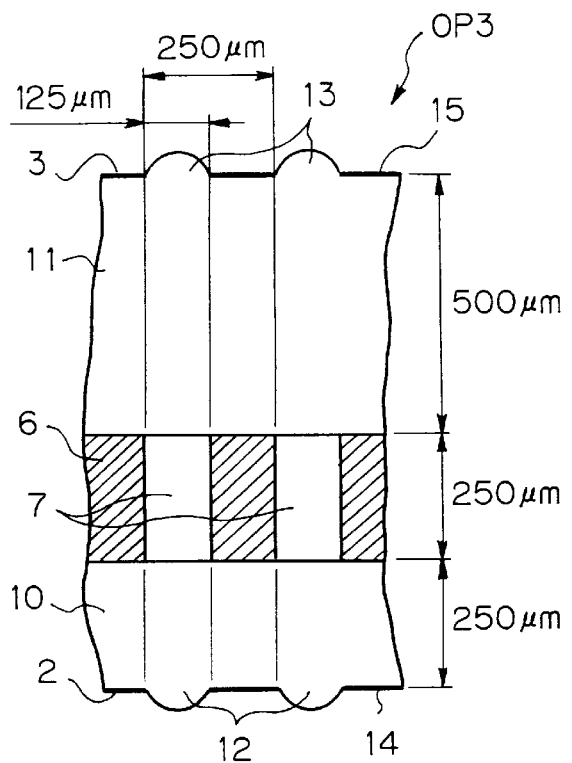
FIG. 4 is a fragmentary section showing a third embodiment of the present invention.

Reference will be made to FIG. 4 for describing a third embodiment of the present invention. This embodiment is implemented as an optical device OP3 suitable for a focusing system. As shown, the optical device OP3 also includes the thick film aperture array 6. Lens arrays 10 and 11 are respectively stacked on the input surface and output surface of the aperture array 6. The lens arrays 10 and 11 are formed of a transparent plastic having a refractive index of about 1.5 by use of precision dies. The lens arrays 10 and 11 have a plurality of lens portions 12 and a plurality of lens portions 13, respectively. Shield films 14 and 15 are respectively formed on the surfaces of the lens arrays 10 and 11 opposite to the surfaces adjoining the aperture array 6 except for the lens portions 12 and 13, constituting the input aperture array 2 and output aperture array 3, respectively. The shield films 14 and 15 are formed of, e.g., chromium. The portions where the lens portions 12 protrude and the portions where the lens portions 13 protrude correspond to the input apertures 4 and output apertures 5, respectively.

The input lens array 10, output lens array 11 and thick film aperture array 6 are 250 μm thick, 500 μm thick, and 250 μm thick, respectively. The lens portions 12 and 13 corresponding to the input apertures and output apertures, respectively, and the apertures 7 of the aperture array 6 each are arranged at a period of 250 μm and provided with a width of 125 μm. Each lens portion 12 of the input lens array 10 has a radius of curvature of 134 μm in the direction of arrangement of the lense portions 12 and a radius of curvature of 268 μm in the direction of optical axis. Each lens 13 of the output lens array 11 has a radius of curvature of 139 μm in the direction of arrangement of the lense portions 13 and a radius of curvature of 278 μm in the direction of optical axis. The optical device OP3 for a focusing system is configured such that the pattern of an object plane spaced from the input aperture array 2 by 1 mm is focused to a plane spaced from the output aperture array 3 by 1 mm in the form of an erect 1:1 image.

In the optical device OP3, light incident to the input lens portions 12 are output via the lens portions 13 respectively facing the input lens portions 12. Propagation of the light to the lens portions or output apertures 13 next to the expected ones is obviated by the thick film aperture array 6. Because the aperture array 6 has a thickness smaller than the distance between the input aperture array 2 and the output aperture array 3, it is possible to provide it with a small aspect ratio and facilitate fabrication, as in the first embodiment.

The optical device OP3 is easy to fabricate. Specifically, after the centers of the lens portions 12 of the lens array or plastic molding 10 and those of the lens portions 13 of the lens array or plastic molding 11 have been aligned, the lens arrays 10 and 11 are stacked on the opposite sides of the aperture array 6. To produce the aperture array 6, a 250 μm thick stainless steel sheet is punched to form the apertures 7.

4th Embodiment

Figure 5:
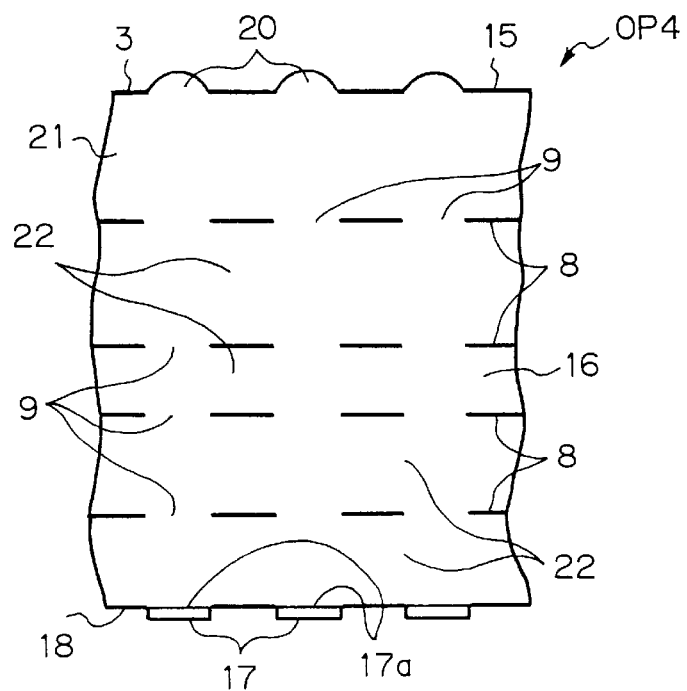
FIG. 5 is a fragmentary section showing a fourth embodiment of the present invention.

FIG. 5 shows a fourth embodiment of the present invention. This embodiment is implemented as an optical head for writing a latent image electrostatically on a photoconductive element. As shown, an optical device OP4 includes an aperture array 16. An LED array 18 and a microlens 21 are respectively stacked on the input side and output side of the aperture array 16. The LED array 18 has a number of LEDs 17 arranged at a preselected period while the microlens 21 has a number of lens portions 20.

The LED array 18 corresponds to the input aperture array 2 of the previous embodiments. The light emitting surfaces 17a of the LEDs 17 correspond to the input apertures 4. The microlens 21 is formed of quartz glass and provided with a refractive index of 1.5 and a thickness of 250 μm. A shield film 15 is formed of, e.g., chromium and formed on the output side of the microlens 21 except for the lens portions 20, constituting the output aperture array 3. The portions of the microlens 21 where the lens portions 20 protrude correspond to the output apertures 5 of the previous embodiments.

In the illustrative embodiment, the aperture array 16 is formed by the following procedure. First, a plurality of transparent substrates (quartz glass whose refractive index is 1.5) 22 are shielded except for their regions where the apertures 9 are formed at a preselected period of arrangement, thereby constituting the thin film aperture array layers 8. Then, the substrates 22 are stacked. In this case, the shield portions of the aperture array layers 8 are formed by the evaporation of chromium or similar material.

The lens portions 20 and apertures 9 playing the role of output apertures are arranged at a period of 42.5 µm. The apertures 9 have a width of 20 µm each while the lens portions 20 have a radius of curvature of 200 µm each. The LEDs 17 are arranged at a period of 42.5 µm while the light emitting surfaces 17a thereof each is provided with a width of 20 µm. The apertures 9 of the thin film aperture array layers 8 each has a ratio of a width to the period of arrangement selected to be less than 0.5 mm inclusive.

One or more thin film aperture array layers 8 each is located at a position spaced from the light emitting surfaces 17a by a distance which is an integral multiple of $T/2^k$ (k being a positive integer). In the illustrative embodiment, the distance T between the light emitting surfaces 17a of the LED array 18 and the output aperture array 3 is selected to be 1 mm. The transparent substrate 22 closest to the LED array 18 to the transparent substrate 22 remotest from the same are respectively 313 µm thick, 375 µm thick, 125 µm thick, and 250 µm thick. It follows that the thin film aperture array layers 8 are respectively spaced from the light emitting surfaces 17a by 5 mm/16, 3 mm/8, 1 mm/2, and 3 mm/4.

In the above configuration, when any one of the LEDs 17 selected emits light, the leak of the light can be obviated over a broad range from the lens portion (output aperture) 20 next to the expected lens portion 20 to the remote lens portion 20. Specifically, because the thin film aperture array layers 8 are arranged at 5/16 ($5T/2^k$ where k is 4), the leak of light can be obviated over a range of up to sixteen times as great as the period of arrangement of the lens portions 20.

The aperture array 16 implemented by a plurality of spaced thin film aperture array layers 8 is comparable with a thick film aperture array as to the shielding ability. The individual aperture array layer 8 can have its aspect ratio to be reduced, as stated earlier. In addition, the distance between nearby aperture array layers 8 and the positions of the individual layers 8 can be set with accuracy on the basis of the thickness of each transparent substrate 22.

5th Embodiment

Figure 6:
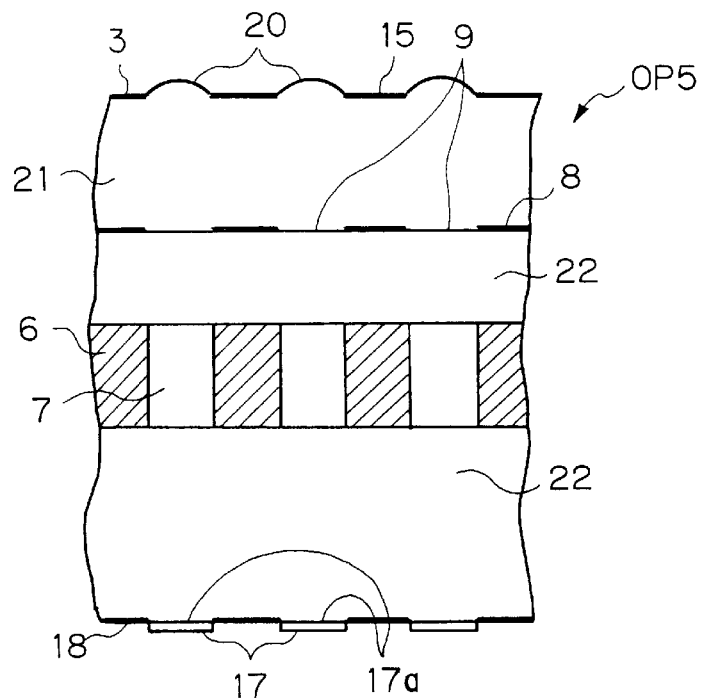
FIG. 6 is a fragmentary section showing a fifth embodiment of the present invention.

Referring to FIG. 6, a fifth embodiment of the present invention is implemented as an optical device OP5 also playing the role of an optical head for writing a latent image electrostatically. As shown, the optical device OP5 similar to the optical device OP4, FIG. 5, except that a single thick film aperture array 6 is substituted from the thin film aperture array layers 8. Specifically, the optical device OP5 is made up of the transparent substrate 22, thick film aperture array 6, transparent substrate formed with the thick film aperture array 8, and microlens 21 formed with the output aperture array 3 on its surface. The lens portions 20 and apertures 9 are arranged at a period of 42.5 µm. The apertures 9 each have a width of 20 µm while the lenses 20 each have a radius of curvature of 200 µm. The LEDs 17 are arranged at a period of 42.5 µm while their light emitting surfaces 17a are 20 µm wide each.

The thin film aperture array 8 and opposite sides of the thick film aperture array 6 are located at at least one position spaced from the light emitting surfaces 17a by a distance which is an integral multiple of $T/2^k$. In the illustrative embodiment, too, the distance T between the light emitting surfaces 17a of the LED array 18 and the output aperture array 3 is selected to be 1 mm. The transparent substrate 22 closest to the LED array 18 is 375 µm thick. The aperture array 6 is 185 µm thick. The transparent substrate 22 with the thin film aperture array layer 8 is 190 µm thick. The microlens 21 is 250 µm thick. In these conditions, the thin film aperture array layer 8 is spaced from the light emitting surfaces 17a by 3 mm/4 while opposite surfaces of the aperture array 6 are spaced from the same by 3 mm/8 and 9 mm/16, respectively.

In the above configuration, when any one of the LEDs 17 selected emits light, the leak of the light can be obviated over a broad range from the lens portion (output aperture) 20 next to the expected lens portion 20 to the remote lens portion 20.

Because this embodiment includes both of the thin film aperture array layer 8 and thick film aperture array 6, it successfully reduces the number of shielding parts, compared to the fourth embodiment of FIG. 5 including only the thin film aperture array layers 8. The thin film aperture array 8 allows the aspect ratio of the thick film aperture array 6 to be further reduced, promoting easy fabrication.

6th Embodiment

Figure 7:
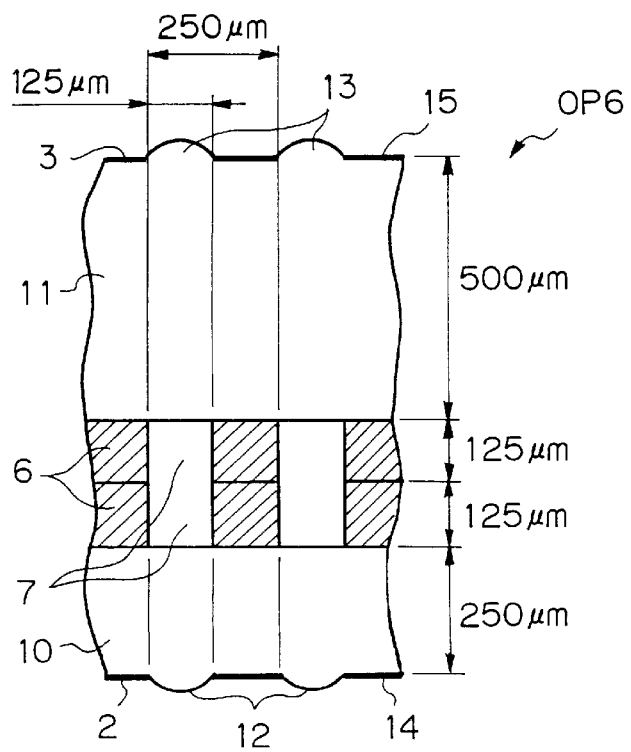
FIG. 7 is a fragmentary section showing a sixth embodiment of the present invention.

FIG. 7 shows a sixth embodiment of the present invention suitable for a focusing system. As shown, an optical device OP6 is made up of the input lens array 10, two thick film aperture arrays 6 and output lens array 11 stacked together. A transparent plastic having the same refractive index as the glass constituting the lens arrays 10 and 11 is buried in the apertures 7 of the aperture arrays 6 in order to prevent light from being reflected at the interfaces between them and the lens arrays 10 and 11. The shield plates 14 and 15 of, e.g., chromium are respectively formed on the surfaces of the lens arrays 10 and 11 opposite to the surfaces adjoining the aperture arrays 6 except for the lens portions 12 and 13, constituting the input aperture array 2 and output aperture array 3, respectively. The portions where the lense portions 12 protrude and the portions where the lense portions 13 protrude correspond to the input apertures and output apertures, respectively.

The input lens array 10 and output lens array 11 are 250 µm thick and 500 µm thick, respectively. The two thick film aperture arrays 6 are each 125 µm thick. Each lens portion 12 of the input lens array 10 and each lens portion 13 of the output lens array 11 have radii of curvature of 134 µm and 139 µm, respectively. The optical device OP6 for a focusing system is configured such that the pattern of an object plane spaced from the input aperture array 2 by 1 mm is focused to a plane spaced from the output aperture array 3 by 1 mm in the form of an erect 1:1 image.

In the optical device OP6, light incident to any one of the lens portions 12 is output via the lens portion 13 aligned with the lens portion 12. The light is prevented from reaching the lens portion or outlet aperture 13 next to the above expected lens portion 13 by the thick film aperture arrays 6. The two aperture arrays 6 can have their thickness reduced. In the illustrative embodiment, the apertures 7 which are 125 µm wide are implemented by a stainless steel sheet whose thickness is as small as the width of the apertures 7, promoting easy fabrication using punching or similar thin sheet machining technology.

7th Embodiment

Figure 8A:
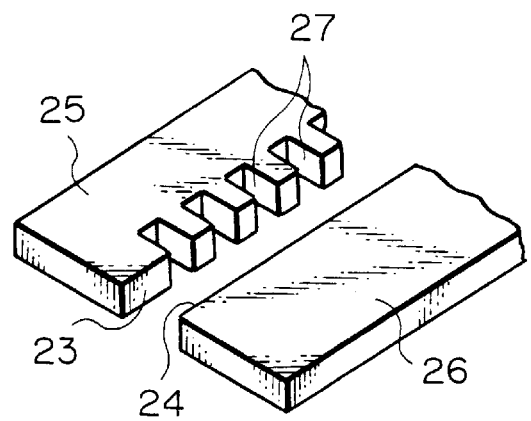
FIGS. 8A–8C are perspective views showing a seventh embodiment of the present invention.
Figure 8B:
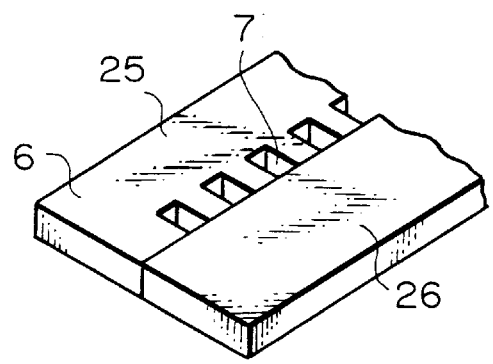
Figure 8C:
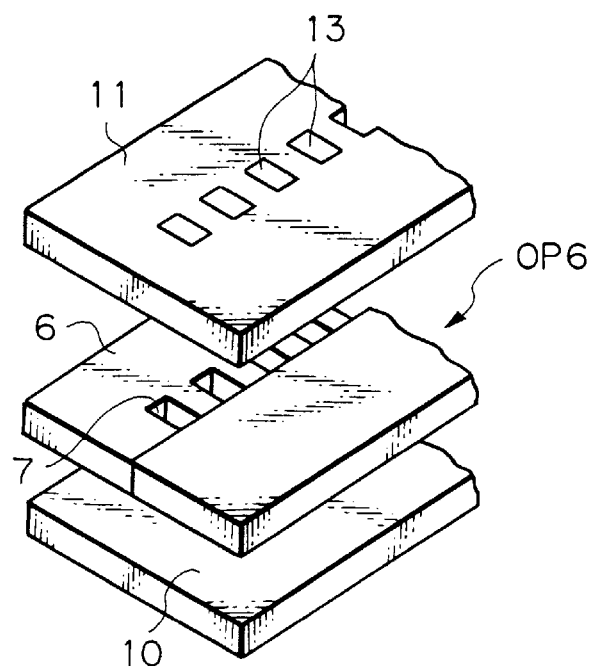

FIGS. 8A–8C show a seventh embodiment of the present invention relating to a method of producing the thick film aperture array 6. First, as shown in FIG. 8A, two light shielding substrates 25 and 26 having bonding edges 23 and 24, respectively, are prepared. If desired, a single light shielding substrate may be divided into two by, e.g., dicing. The substrates 25 and 26 each may be implemented by, but not limited to, a stainless steel sheet. Subsequently, at least one of the bonding edges 23 and 24 (23 in the embodiment)

is formed with a number of notches 27 perpendicular to the general plane of the substrate 25 by dicing or similar technology. Then, as shown in FIG. 8B, the bonding edges 23 and 24 are bonded together in order to produce the aperture array 6.

Specifically, the notches 27 formed in the bonding edge 23 before bonding each are generally U-shaped and open at one side. Such notches 27 can be easily formed without regard to the thickness of the substrate 25 or 26. By bonding the two substrates 25 and 26 at their edges 23 and 24, it is possible to constitute the thick film aperture array 6 having a great aspect ratio with ease.

After two aperture arrays 6 each having the above configuration have been stacked, their apertures 7 are filled with a plastic having the same refractive index as the lens arrays 10 and 11. Subsequently, as shown in FIG. 8C, the lens arrays 10 and 11 are respectively bonded to opposite sides of the laminate of the aperture arrays 6, thereby producing, e.g., the optical device OP6 shown in FIG. 7.

When either the lens array 10 or the lens array 11 is stacked on the input side or the output side of the aperture arrays 6, it may be difficult to align the centers of the lens portions 12 or 13 and the apertures 7. Even in such a case, the apertures 7 and lens portions 12 or 13 can be accurately aligned only if a transparent substrate is adhered to the desired surface of the laminate of the aperture arrays 6, then the centers of the apertures and those of lens portions to be formed are positioned by photolithography, and then the lens portions are formed on the transparent substrate by, e.g., etching.

Further, to implement a desired aspect ratio, a desired number of thin light shielding substrates each having a plurality of apertures corresponding to the apertures 7 at a preselected period of arrangement may be stacked with their apertures aligning with each other. This promotes easy fabrication because the individual substrate has an extremely small aspect ratio.

In summary, it will be seen that the present invention provides an optical device and a method of fabricating an aperture array for shielding light having various unprecedented advantages, as enumerated below.

(1) Only a part of a gap between an input aperture array and an output aperture array can be shielded by an aperture array, so that light is prevented from being output via output apertures other than expected one. This allows the aspect ratio of the aperture array for shielding light to be reduced and thereby facilitates the fabrication of a thick film aperture array.

(2) By suitably selecting the number and positions of thin film aperture array layers, it is possible to set up any desired shielding region other than the output aperture from which light should be output. The thin film aperture array layers are easy to produce because they each have an extremely small aspect ratio.

(3) The aperture array, as well as the thin film aperture array layers, can have its opposite sides located at desired positions between the input aperture array and the output aperture array by using $T/2^k$ as a unit distance. This successfully prevents light from leaking via the output apertures other than expected one. In addition, the number of shielding parts is reduced, compared to a case using only the thin film aperture array layers.

(4) By stacking a desired number of light shielding substrates formed with apertures, it is possible to set up a desired aspect ratio. In addition, because the individual substrate has an extremely small aspect ratio, easy fabrication is promoted.

(5) Notches formed in the bonding edge of a light shielding substrate before bonding each is open at one side. Such notches can be easily formed without regard to the thickness of the substrate. Further, by bonding two substrates at their bonding edges, it is possible to constitute a thick film aperture array having a great aspect ratio with ease.

(6) There can be reduced the ratio of the thickness of the thin film aperture array layer to the width of each aperture, i.e., the aspect ratio. Further, the light shielding range can be freely varied on the basis of the number and thickness of transparent substrates to be formed with the thin film aperture array layers. In addition, the distance between nearby thin film aperture layers and the positions of the individual layers can be accurately set up on the basis of the thickness of each substrate.

Various modifications will become possible for those skilled in the art after receiving the teachings of the present disclosure without departing from the scope thereof.

What is claimed is:

1. An optical device comprising:
   an input aperture array formed with a plurality of input apertures at a preselected period of arrangement;
   an output aperture array formed with a plurality of output apertures respectively facing said plurality of input apertures at a preselected period of arrangement; and
   an aperture array intervening between said input aperture array and said output aperture array and formed with apertures respectively facing said plurality of input apertures and said plurality of output apertures at a preselected period of arrangement;
   said aperture array satisfying the following conditions:

$$t2 > T \cdot (r+R)/(P+r-\rho)$$
   $$t1 < t2 \cdot (P-\rho-r)/(P+\rho-r)$$

where T denotes a distance between said input aperture array and said output aperture array, r denotes a half-width of said input apertures, $\rho$ denotes a half-width of said output apertures, R denotes a half-width of said apertures, t1 denotes a distance between said input aperture array and an input surface of said aperture array, and t2 denotes a distance between said input aperture array and an output surface of said aperture array.

2. An optical device comprising:
   an input aperture array formed with a plurality of input apertures at a preselected period of arrangement;
   an output aperture array formed with a plurality of output apertures respectively facing said plurality of input apertures at a preselected period of arrangement; and
   a thin film aperture array layer intervening between said input aperture array and said output aperture array and formed with apertures respectively facing said plurality of input apertures and said plurality of output apertures at a preselected period of arrangement;
   said thin film aperture array layer being located at at least one position spaced from said input aperture array by a distance which is an integral multiple of $T/2^k$ where T denotes a distance between said input aperture array and said output aperture array, and k is a positive integer.

3. An optical device as claimed in claim 2, wherein said aperture array layer is positioned in a range of at least two positions spaced from said input aperture array by integral multiples of $T/2^k$.

* * * * *